(12) United States Patent
Stiesdal

(10) Patent No.: US 8,113,788 B2
(45) Date of Patent: Feb. 14, 2012

(54) ROTOR BLADE

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 523 days.

(21) Appl. No.: 12/350,370

(22) Filed: Jan. 8, 2009

(65) Prior Publication Data

US 2009/0180889 A1 Jul. 16, 2009

Related U.S. Application Data

(60) Provisional application No. 61/020,455, filed on Jan. 11, 2008.

(51) Int. Cl.
*B63H 1/28* (2006.01)
(52) U.S. Cl. ............... 416/245 R; 416/234; 416/238; 416/239; 415/4.3; 415/4.5
(58) Field of Classification Search .......... 415/4.3, 415/4.5; 416/234, 238, 239, 245 R
See application file for complete search history.

(56) References Cited

U.S. PATENT DOCUMENTS 7,914,261 B2 * 3/2011 Wobben .............. 416/234

FOREIGN PATENT DOCUMENTS

| EP | 1295032 B1 | 3/2003 |
| EP | 1845258 A1 | 10/2007 |
| WO | 0208600 A1 | 1/2002 |

* cited by examiner

*Primary Examiner* — Michelle Estrada

(57) ABSTRACT

Disclosed is a surface of the blade having a cylindrical root portion, an airfoil portion and a transition portion connecting the root portion with the airfoil portion, wherein the blade comprises a shoulder at the border between the transition portion to the airfoil portion, wherein the blade comprises an element which is arranged substantially at the root portion and/or at the transition portion which creates a slot between the element and the surface of the blade.

16 Claims, 3 Drawing Sheets

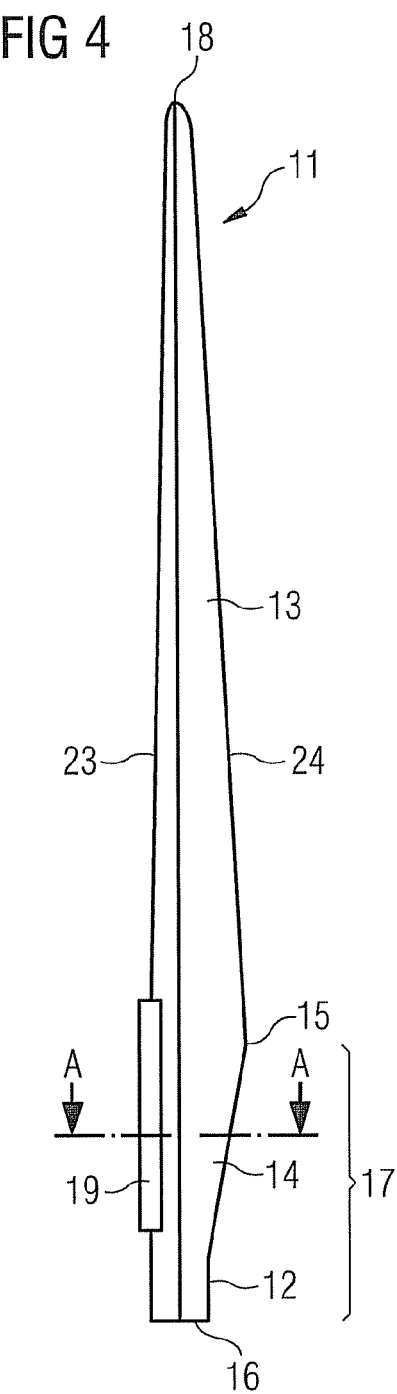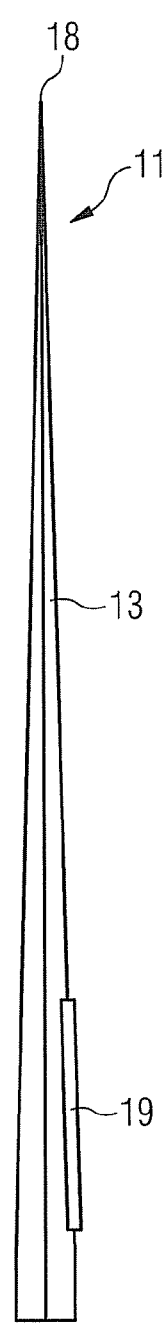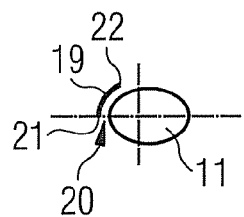

FIG 8
FIG 9
FIG 10
FIG 11
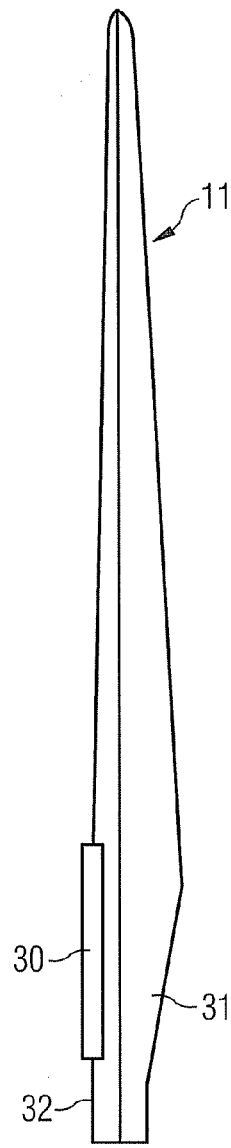
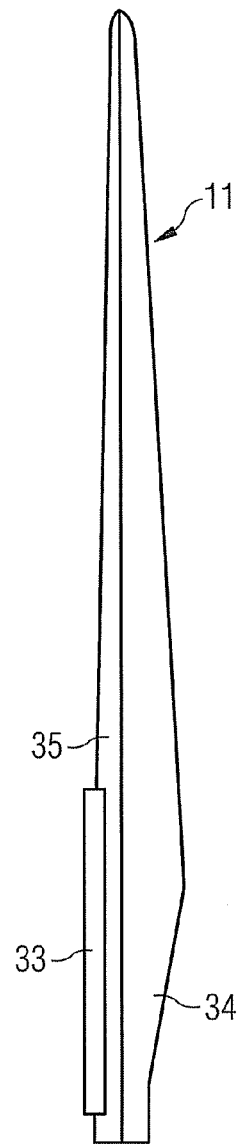
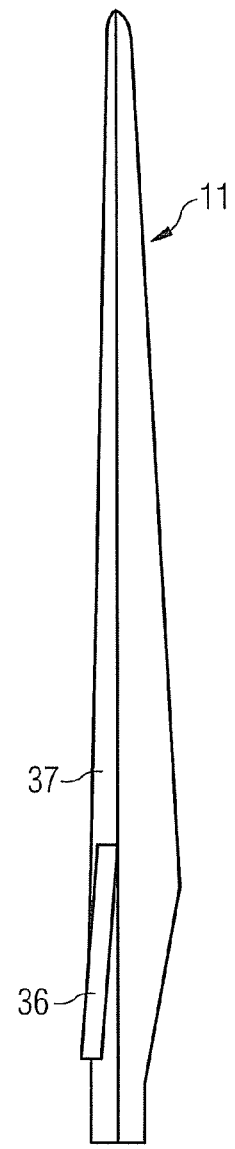
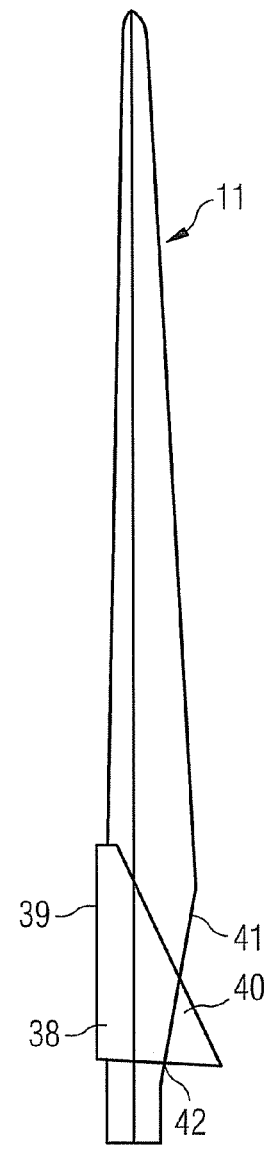

ROTOR BLADE

CROSS REFERENCE TO RELATED APPLICATIONS

This application claims the benefits of provisional application No. 61/020,455 filed Jan. 11, 2008 and is incorporated by reference herein in its entirety.

FIELD OF THE INVENTION

The invention relates to a rotor blade especially a wind turbine rotor blade as claimed in the claims.

BACKGROUND OF THE INVENTION

Wind turbine rotor blades are well known. A known wind turbine rotor blade is disclosed in EP 1 845 258 A1 containing a cylindrical root portion, an airfoil portion and a transition portion between the root portion and the airfoil portion with a shoulder as border line between the transition portion and the airfoil portion which ends at the tip of the rotor blade.

The geometry of the airfoil portion of the rotor blade between the shoulder and the tip may have a varying chord with a rather linear, concave or convex chord distribution. The linear chord distribution is easy to manufacture but reveals disadvantages in the overall annual energy production rate. The convex chord distribution of the airfoil portion is basically optimized with respect to structural specifications and reveals a high mechanical stress resistance and durability. The concave chord distribution of the rotor blade is usually optimized with respect to the annual energy production. Therefore the selected chord distribution of the rotor blade is usually a compromise between the energy production rate and durability or cost of the rotor blade.

The prior art document WO 2007/045244 A1 discloses a rotor blade with a root portion and a chord or airfoil portion and a transition portion between the root portion and the airfoil portion. The root portion is split into two partitions and an air gap is formed between the two partitions of the root portion. This reduces the mechanical strength and increases the manufacturing costs since the root portion is difficult to produce.

The prior art document EP 1 295 032 A1 discloses a rotor blade of a wind turbine which contains ribs or members which are used as vortex generators.

Nevertheless the inboard portion and the cylindrical root portion of the rotor blade does not contribute to the annual energy production and therefore this portion is less relevant for the performance of energy production of the rotor blade.

On the other hand the inboard portion including the root portion of the blade is necessary for the structural integrity of the rotor blade and for fastening the rotor blade at the wind turbine rotor.

SUMMARY OF INVENTION

It is an object of the invention to increase the annual energy production of a rotor blade especially of a wind turbine rotor blade without lowering the structural integrity of the rotor blade.

The object of the invention will be solved by a rotor blade according to the features of the claims. The inventive rotor blade comprises a surface of the blade and has a cylindrical root portion, an airfoil portion and a transition portion connecting the cylindrical root portion and the airfoil portion. The rotor blade further comprises a shoulder at the border of the transition portion and the airfoil portion and an element which is substantially arranged at the cylindrical root portion and/or at the transition portion and which creates a slot between the element and the surface of the blade. In other words, a slot is established by mounting of a secondary aerodynamic profile at a distance, preferably a small distance, from the main blade.

By installing permanently attached slots to the inboard part of the blade and possibly to some distance outside the shoulder radius the lift coefficient of the inboard part can be increased. This will cause the inboard part to contribute more significantly to the energy production.

According to the invention it is of advantage that the element is extended to the airfoil portion too. This might increase the effect on the energy production rate of at least some embodiments of the invention even further.

Furthermore it is of advantage that the element has an almost rectangular shape in plan view. This means that the element might be curved or has a planar shape in cross section but is more or less rectangular in shape in a plan view.

According to another embodiment it might be of advantage that the element has a non-rectangular shape in plan view while the leading edge and the trailing edge of the element are non-parallel arranged or aligned to each other. This may lead e.g. to a wing like shape of the element. In particular, the element might have a larger chord at the root end of the root portion than at the opposite end.

According to a further embodiment of the invention the element is arranged with respect to the leading edge of the blade such that the leading edge of the blade is parallel aligned to the leading edge of the element.

According to a further embodiment of the invention the element is arranged with respect to the leading edge of the blade such that the leading edge of the blade is non-parallel aligned to the leading edge of the element.

According to a further embodiment of the invention the element is arranged with respect to the leading edge of the blade such that the leading edge of the blade is parallel aligned to the trailing edge of the element.

According to a further embodiment of the invention the element is arranged with respect to the leading edge of the blade such that the leading edge of the blade is non-parallel aligned to the trailing edge of the element.

Furthermore it might be of advantage that the shape of the element is flat in cross-section. This means that the element is a planar element like a board.

Furthermore it might be of advantage that the shape of the element is bent in cross-sectional view. This leads to a shape which follows at least substantially the surface of the root of the rotor blade or the transition portion of the rotor blade or the shape may deviate from the shape of the blade such that the slot between the element and the surface of the blade varies.

Furthermore it might be of advantage that the element is fastened to the surface of the blade by means of fastening means to assure the creation and the width of the slot between the element and the surface of the blade.

In addition, in any of the mentioned cases, the element may least partly project over the leading edge and/or over the trailing edge when the blade in its operational position is viewed from the upwind side in the direction of the wind.

Moreover, the inventive rotor blade may be designed such that the leading edge of the element is arranged in front of the leading edge of the blade and the element is curved clockwise, as seen from the blade root towards the blade tip, such that the angle between the leading edge and the trailing edge of the element is between 30° and 75°, in particular between 40° and 50°.

Further advantageous features are described within the description of the drawings and/or the claims.

BRIEF DESCRIPTION OF THE DRAWINGS

The above and other features and advantages of the invention will be apparent from the following description of an exemplary embodiment of the invention with reference to the accompanying drawings, in which:

FIG. 4 shows a schematic view of an inventive rotor blade in plan view on the blade seen from the lee side;

FIG. 5 shows a schematic view of a cross section A-A of an inventive rotor blade;

FIG. 6 shows a schematic view of an inventive rotor blade in plan view on the blade seen from the edge;

FIG. 7 shows a schematic view of an inventive rotor blade in plan view on the blade seen from the wind side;

FIG. 8 shows a schematic view of an inventive rotor blade in plan view on the blade seen from the lee side;

FIG. 9 shows a schematic view of an inventive rotor blade in plan view on the blade seen from the lee side;

FIG. 10 shows a schematic view of an inventive rotor blade in plan view on the blade seen from the lee side; and FIG. 11 shows a schematic view of an inventive rotor blade in plan view on the blade seen from the lee side.

DETAILED DESCRIPTION OF INVENTION

Figure 1:
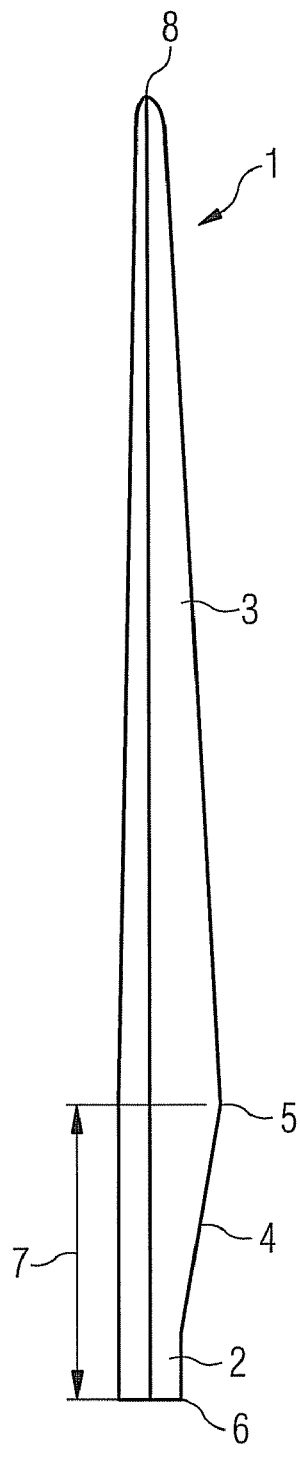
FIG. 1 shows a schematic view of a rotor blade in plan view on the blade seen from the lee side.

FIG. 1 shows schematically a rotor blade in plan view known from the prior art and seen from the lee side. The rotor blade 1 comprises a cylindrical root portion 2, an airfoil portion 3 and a transition portion 4 connecting the root portion 2 with the air foil portion 3. The blade 1 contains a shoulder 5 at the border between the transition portion 4 to the airfoil portion 3. The blade is usually fastened at the root 6 to a hub of a wind turbine, which is not shown in the drawings. The portion of the blade 1 between the root 6 and the shoulder 5 is called the inboard part 7 of the blade 1. As can be seen from FIG. 1a the blade 1 has its largest chord at the height of the shoulder 5 since the chord will be reduced from the shoulder 5 to the tip 8 and from the shoulder to the root 6 respectively.

Figure 2:
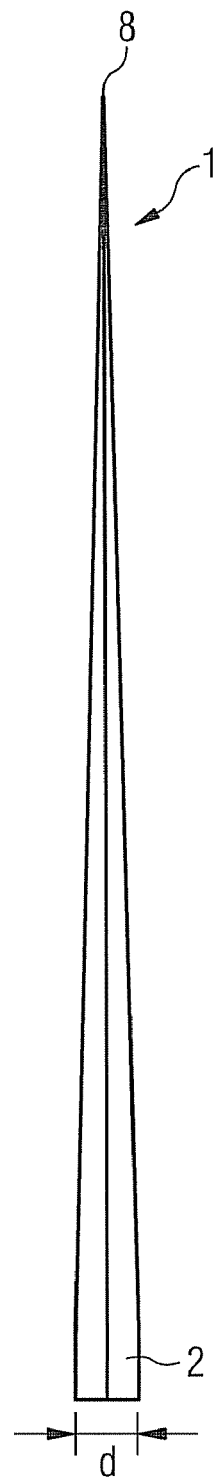
FIG. 2 shows a schematic view of a rotor blade in plan view on the blade seen from the edge.

FIG. 2 shows a schematic view of the rotor blade 1 of FIG. 1 seen from the leading edge of the rotor blade. It can be seen that the width d of the blade 1 is almost constant at the root portion 2 and that the width is continuously reduced from the root portion 2 to the tip 8.

Figure 3:
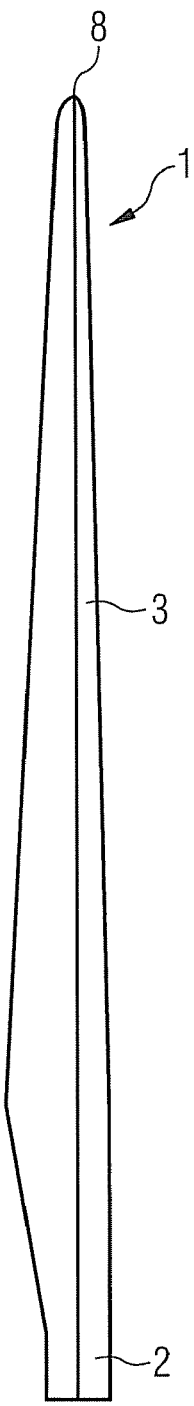
FIG. 3 shows a schematic view of a rotor blade in plan view on the blade seen from the wind side.

FIG. 3 shows a schematically the rotor blade 1 of FIG. 1 in plan view from the wind side. As can be seen, there is no significant difference to the FIG. 1 since the contribution of root portion 2, inboard portion 7 and airfoil portion 3 is just the same.

FIG. 4 shows schematically an inventive rotor blade 11 in plan view and seen from the lee side of the blade 11. The rotor blade 11 comprises a cylindrical root portion 12, an airfoil portion 13 and a transition portion 14 connecting the root portion 12 with the airfoil portion 13. Furthermore the blade 11 comprises a shoulder 15 at the border between the transition portion 14 to the airfoil portion 13. The blade 11 might be fixed at the root 16 to the rotor or hub of the wind turbine. The portion of the blade between the root portion 16 and the shoulder 15 is called the inboard part 17 of the blade 11. The blade 11 has its largest chord at the position of the shoulder 15 since the chord will be reduced from the shoulder 15 to the tip 18 and from the shoulder 15 to the root 6 respectively.

Furthermore the blade 11 comprises an additional element 19 which generates a slot 20 between the element 19 and the surface of the blade 11. The slot 20 will be created by fastening the element 19 at a predetermined distance from the surface of the blade 11. Preferably the element 19 contains or comprises at least one fastening element which allows to fasten the element 19 to the surface of the blade 11 while a predetermined slot 20 between the element 19 and the surface of the blade 11 is created.

As can be seen from FIG. 5 the element 19 has essentially the shape of the surface of the blade 11 but it is arranged at a predetermined distance from the surface to generate the slot 20 between the element 19 and the surface of the blade 11. Accordingly the element 19 has an arcuate shape following the arcuate shape of the blade. The arrangement of the element 19 is such that the one edge of the element 19 is arranged at the height of the edge of the blade 11 and the element 19 is curved clockwise such that the angle between the two edges of the element is almost 45°. According to another embodiment of the invention the angle between the two edges of the element may vary. Accordingly an angle in the range of 30° and 75° might be preferred. The leading edge 21 of the element 19 is at the height of the leading edge 23 of the blade 11, while the trailing edge 22 of the element 19 is parallel to the leading edge of the blade but not parallel to the trailing edge 24 of the blade 11.

As can be seen from FIGS. 4, 6 and 7 the length of the element is almost equal to the length of the transition portion or to the length of the inboard portion. The lower end of the element 19 is located near the beginning of the transition portion and the upper end is located near the shoulder 15 more or less within the airfoil portion 13.

FIGS. 6 and 7 show the arrangement of the slot creating element 19 from different perspectives.

FIGS. 8 to 11 show different embodiments of a slot creating element and its arrangement with respect to the blade 11 or to the edges of the blade 11. FIG. 8 shows an arrangement of an element 30 which has a length which is almost equal to the length of the transition portion 31 and the element 30 is aligned to the leading edge 32 of the blade 11. this means that the leading edge and the trailing edge of the element 30 is parallel aligned to the leading edge 32 of the blade 11.

FIG. 9 shows another arrangement of an element 33 which has an extended length which is extended in the direction of the length of the blade 11 and the length of the element 33 is larger than the length of the transition portion 34 while the element 33 is aligned to the leading edge 35 of the blade 11.

FIG. 10 shows another arrangement of an element 36 which has almost the same length as the element 30 shown in FIG. 8 but the element 36 is angled to the leading edge 37 of the blade 11. The elements shown in FIGS. 8 to 10 have a rectangular or trapezoidal shape in plan view.

FIG. 11 shows an element 38 which deviates from the rectangular or trapezoidal shape in plan view since the two edges, the leading edge 39 and the trailing edge 40 are non parallel aligned to each other. Therefore the element 38 looks like a wing. Furthermore the angle between the leading edge 39 and the trailing edge 40 of the element 38 is not the same angle which shows up between the transition portion 41 of the blade 11 and the leading edge 39 of the element 38. In other words the angle between the trailing edge 40 of the element 38 and the trailing edge 42 of the transmission portion 41 is larger than 90°.

All the embodiments of the FIGS. 4 to 11 show an element which might be flat or bend in cross-section according to the shape of the surface of the blade but which is positioned in a certain distance from the surface of the blade. Therefore a predetermined slot is created between the element and the surface of the blade.

According to another embodiment of the invention, the bended shape of the element might vary from the bended shape of the surface of the blade such that the slot will vary in distance and/or in width. One very simple embodiment of the element has a flat shape like a board and has a rectangular, trapezoidal or non-rectangular shape in plan view.

Accordingly the cross-sectional width of the slot between the element and the surface of the blade may be of aerodynamic shape or it may be simple with almost uniform width along the camber surface of the element. According to another embodiment the width varies since the element is for instance a flat board only and the surface of the blade varies.

According to another advantageous aspect of the invention the production of the slot, the element or the elements may be fitted to the blade already during production of the blade or it might be added later on, e.g. prior to installation of the blade.

According to another embodiment of the invention the element is positioned in the area of the root of the blade and might be extended to the shoulder of the blade or a bit further out and for some distance inboard of the shoulder.

The fastening of the element may be such that the element is e.g. attached to the blade surface at the root end of the element and/or at the other end of the element. According to another embodiment of the invention the element may comprise at least one or two fastening means to fasten the element at the surface of the blade.

The invention claimed is:

1. A rotor blade having a blade surface, comprising:
a cylindrical root portion;
an airfoil portion;
a transition portion that connects the root portion with the airfoil portion, wherein a shoulder is arranged at a border between the transition portion and the airfoil portion; and
an element arranged on the rotor blade and arranged substantially at the cylindrical root portion and/or at the transition portion and which creates a slot between the element and the surface of the blade.

2. A rotor blade having a blade surface, comprising:
a cylindrical root portion;
an airfoil portion;
a transition portion that connects the root portion with the airfoil portion, wherein a shoulder is arranged at a border between the transition portion and the airfoil portion; and
an element arranged substantially at the cylindrical root portion and/or at the transition portion and which creates a slot between the element and the surface of the blade, wherein the element extends to the airfoil portion.

3. The rotor blade according to claim 2, wherein the element has a rectangular or trapezoidal shape in plan view.

4. The rotor blade according to claim 2, wherein the element has a non-rectangular or non-trapezoidal shape in plan view while a leading edge and a trailing edge of the element are non-parallel aligned to each other.

5. A rotor blade having a blade surface, comprising:
a cylindrical root portion;
an airfoil portion;
a transition portion that connects the root portion with the airfoil portion, wherein a shoulder is arranged at a border between the transition portion and the airfoil portion; and
an element arranged substantially at the cylindrical root portion and/or at the transition portion and which creates a slot between the element and the surface of the blade, and
wherein the element is arranged with respect to a leading edge of the blade such that the leading edge of the blade is parallel aligned to the leading edge of the element.

6. The rotor blade according to claim 1, wherein the element is arranged with respect to a leading edge of the blade such that the leading edge of the blade is non-parallel aligned to the leading edge of the element.

7. The rotor blade according to claim 1, wherein the element is arranged with respect to the leading edge of the blade such that the leading edge of the blade is parallel aligned to a trailing edge of the element.

8. The rotor blade according to claim 1, wherein the element is arranged with respect to the leading edge of the blade such that the leading edge of the blade is non-parallel aligned to a trailing edge of the element.

9. The rotor blade according to claim 1, wherein the shape of the element is flat in cross-section.

10. The rotor blade according to claim 1, wherein the shape of the element is bent in cross-section.

11. The rotor blade according to claim 1, wherein the shape of the element is arcuate curved in cross-section.

12. The rotor blade according to claim 1, wherein the element is fastened to the surface of the blade via a fastening device to assure the creation of the slot between the element and the surface of the blade.

13. The rotor blade according to claim 1, wherein the element at least partly projects over the leading edge and/or over the trailing edge of the blade.

14. The rotor blade according to claim 1 wherein the leading edge of the element is arranged in front of the leading edge of the blade and the element is curved clockwise, as seen from the blade root towards the blade tip, such that the angle between the leading edge and the trailing edge of the element is between 30° and 75°.

15. The rotor blade according to claim 1, wherein the element has a rectangular or trapezoidal shape in plan view.

16. The rotor blade according to claim 1, wherein the element has a non-rectangular or non-trapezoidal shape in plan view while a leading edge and a trailing edge of the element are non-parallel aligned to each other.

* * * * *